(12) United States Patent
Rentfrow

(10) Patent No.: US 11,199,224 B2
(45) Date of Patent: Dec. 14, 2021

(54) HYBRID MODULE BEARING INSTALLATION

(71) Applicant: Schaeffler Technologies AG & Co. KG, Herzogenaurach (DE)

(72) Inventor: Peter Rentfrow, Doylestown, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/811,513

(22) Filed: Mar. 6, 2020

(65) Prior Publication Data

US 2021/0277946 A1    Sep. 9, 2021

(51) Int. Cl.
*F16C 33/38* (2006.01)
*F16C 19/22* (2006.01)
*F16C 19/49* (2006.01)
*B60K 6/20* (2007.10)
*F16B 37/08* (2006.01)

(52) U.S. Cl.
CPC ............... *F16C 33/38* (2013.01); *B60K 6/20* (2013.01); *F16C 19/225* (2013.01); *B60Y 2200/92* (2013.01); *F16B 37/08* (2013.01); *F16C 2226/60* (2013.01); *F16C 2361/43* (2013.01)

(58) Field of Classification Search
CPC ........ F16C 19/00; F16C 19/225; F16C 19/49; F16C 19/56; F16C 33/38; F16C 37/0857; F16C 39/12; F16C 2226/60; F16C 2361/43; F16B 37/08; F16B 39/02; F16B 39/04; F16B 37/0857; F16B 39/12; B60K 6/20; B60Y 2200/92

USPC ....... 384/523, 537, 559, 561–562, 585, 903, 384/906; 411/221, 223, 233, 929, 934, 411/995, 999; 285/276
See application file for complete search history.

(56) References Cited

U.S. PATENT DOCUMENTS

| | | | | |
|---|---|---|---|---|
| 1,440,938 | A | * | 1/1923 | Sieroslawski ........... F16B 39/10 411/221 |
| 2,815,973 | A | * | 12/1957 | Jackson ............... F16J 15/3236 277/572 |
| 5,857,783 | A | * | 1/1999 | Johansson ............. F16C 35/078 384/556 |
| 6,095,735 | A | * | 8/2000 | Weinstein ............... F16B 39/10 411/197 |

(Continued)

FOREIGN PATENT DOCUMENTS

| | | | | |
|---|---|---|---|---|
| JP | 2012145207 | A | * 8/2012 | ............. F16H 57/02 |
| WO | WO-2014025048 | A1 | * 2/2014 | ............... B60K 6/38 |

*Primary Examiner* — Marcus Charles
(74) *Attorney, Agent, or Firm* — Kevin L. Parks

(57) ABSTRACT

A hybrid module includes a first component, a second component, a first bearing, and a retainer. The first component has a pilot surface and a threaded portion, and the second component has a shaft and a tool. The tool has a first drive profile. The first bearing is installed on the pilot surface and the retainer is threaded onto the threaded portion. The retainer has a second drive profile, complementary to the first drive profile. A second bearing may be installed between the first component and the shaft, and a retaining ring may be installed in the shaft or the first component to prevent axial displacement of the shaft relative to the first component. The retainer may be disposed on a first axial side of the first bearing, and the second bearing may be disposed on a second axial side of the first bearing, opposite the first axial side.

17 Claims, 5 Drawing Sheets

(56) References Cited

U.S. PATENT DOCUMENTS

| | | | | |
|---|---|---|---|---|
| 9,649,882 B2* | 5/2017 | Downs | ................... | B60B 35/125 |
| 10,465,780 B2* | 11/2019 | Pyers | ..................... | H02K 1/223 |
| 10,486,467 B2* | 11/2019 | Downs | .................... | G01P 3/487 |
| 10,850,605 B2* | 12/2020 | Satyaseelan | .............. | B60K 6/40 |
| 2010/0105518 A1* | 4/2010 | Kasuya | ................... | B60K 6/48 |
| | | | | 477/5 |
| 2012/0032544 A1* | 2/2012 | Kasuya | ................... | B60L 15/20 |
| | | | | 310/90 |
| 2016/0105060 A1* | 4/2016 | Lindemann | .............. | H02K 1/27 |
| | | | | 701/22 |
| 2016/0109010 A1* | 4/2016 | Lindemann | ............. | F16H 41/28 |
| | | | | 192/3.21 |
| 2019/0128394 A1 | 5/2019 | Satyaseelan et al. | | |
| 2019/0190334 A1* | 6/2019 | Payne | ..................... | B60K 6/48 |

* cited by examiner

HYBRID MODULE BEARING INSTALLATION

TECHNICAL FIELD

The present disclosure relates generally to a hybrid module, and more specifically to a method of installing a bearing in a hybrid module.

BACKGROUND

Hybrid modules are known. One example is shown and described in commonly-assigned United States Patent Application Publication No. 2019/0128394 titled TORQUE CONVERTER FOR MODULAR HYBRID TRANSMISSION INCLUDING COAST ENGAGEMENT STRUCTURE, hereby incorporated by reference as if set forth fully herein.

SUMMARY

Example embodiments broadly comprise a hybrid module including a first component, a second component, a first bearing, and a retainer. The first component has a pilot surface and a threaded portion, and the second component has a shaft and a tool. The tool has a first drive profile. The first bearing is installed on the pilot surface and the retainer is threaded onto the threaded portion. The retainer has a second drive profile, complementary to the first drive profile. In some example embodiments, the hybrid module has a second bearing installed between the first component and the shaft, and a retaining ring installed in the shaft or the first component to prevent axial displacement of the second bearing and the shaft relative to the first component. In an example embodiment, the retainer is disposed on a first axial side of the first bearing, and the second bearing is disposed on a second axial side of the first bearing, opposite the first axial side.

In an example embodiment, the first component is a portion of a housing for the hybrid module, and the housing is arranged for fixing to a combustion engine or a multi-speed transmission. In some example embodiments, the second component includes a backing plate fixed to the shaft, and the tool is fixed to the backing plate. In an example embodiment, the second component further includes a clutch carrier fixed to the backing plate.

In some example embodiments, the hybrid module includes a rotor carrier. The first bearing has an inner race installed on the pilot surface, and an outer race installed in the rotor carrier to radially position the rotor carrier relative to the first component. In an example embodiment, the rotor carrier is drivingly engaged with a rotor of an electric motor. In an example embodiment, the hybrid module has a torque converter fixed to the rotor carrier. In an example embodiment, the shaft has a spline arranged for driving engagement with a combustion engine or a damper.

In some example embodiments, the first drive profile has a plurality of circumferentially spaced indentations, and the second drive profile has a plurality of circumferentially spaced tabs arranged to engage the plurality of circumferentially spaced indentations. In an example embodiment, the plurality of circumferentially spaced tabs extend radially inwards. In an example embodiment, the hybrid module has a clutch piston sealed to the shaft. In an example embodiment, the hybrid module has a third bearing installed radially between the pilot surface and the shaft.

Other example aspects broadly comprise a method of installing a bearing in a hybrid module, including providing a first component with a pilot surface and a threaded portion, providing a second component with a shaft and a tool, installing a first bearing on the pilot surface, engaging the tool with a retainer, rotating the shaft to thread the retainer onto the threaded portion using the tool, and axially displacing the shaft to disengage the tool from the retainer. In an example embodiment, the method includes installing a second bearing between the first component and the shaft, and installing a retaining ring to prevent axial displacement of the second bearing and the shaft relative to the first component. In an example embodiment, the first component is a portion of a housing for the hybrid module, and the housing is arranged for fixing to a combustion engine or a multi-speed transmission.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
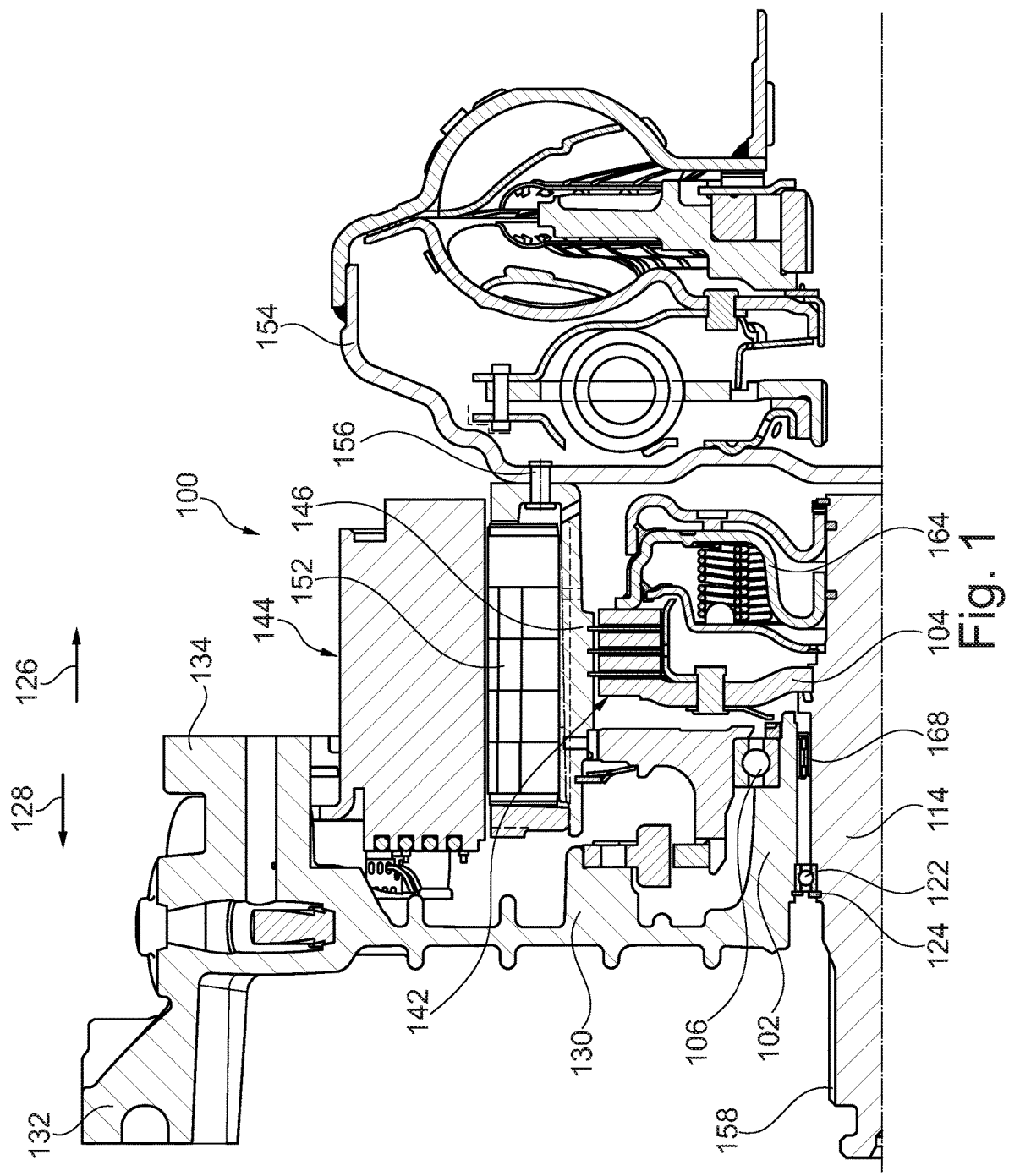
FIG. 1 illustrates a top-half cross-sectional view of a hybrid module according to an example embodiment of the disclosure.
Figure 2:
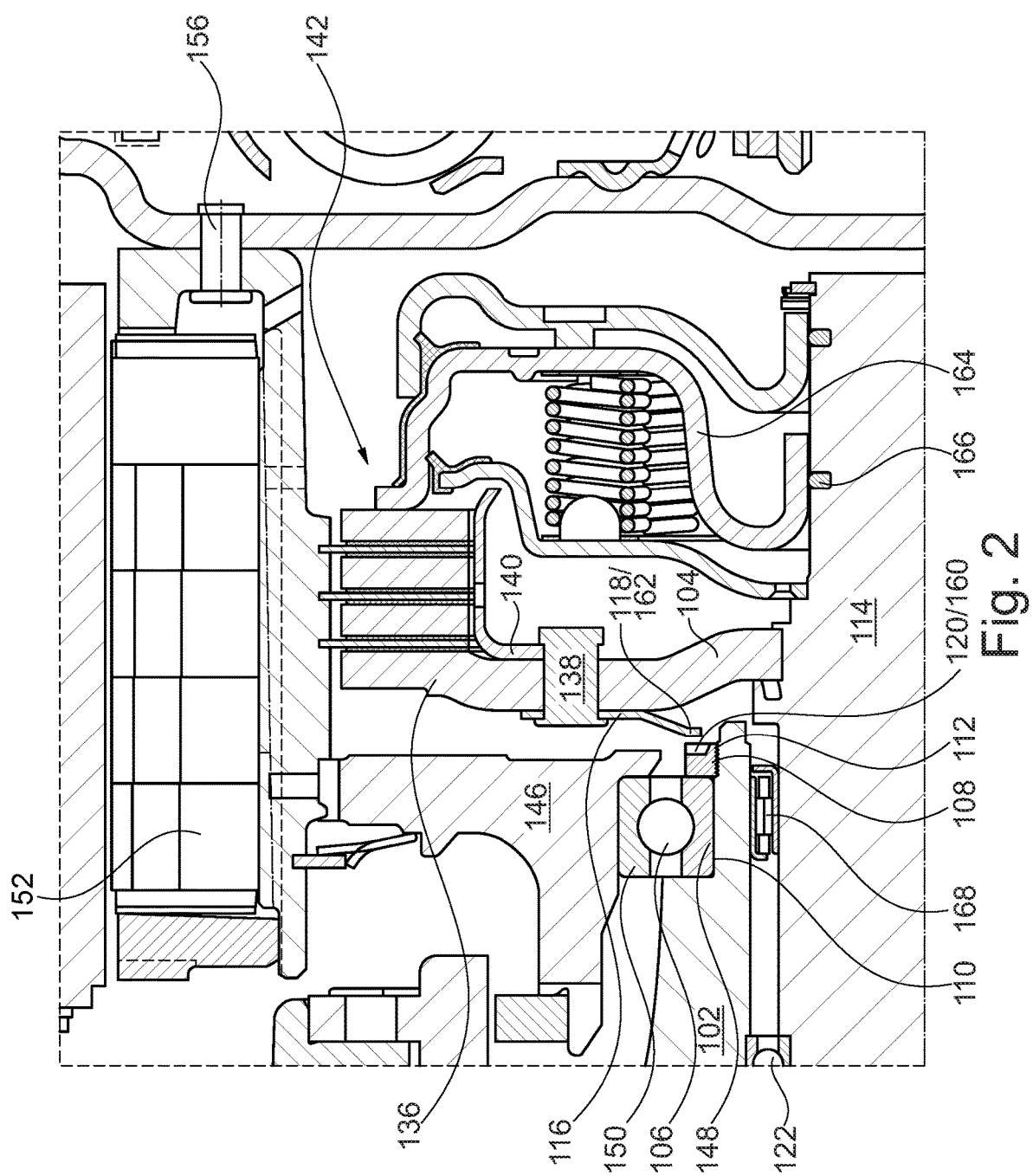
FIG. 2 illustrates a detail view of a portion of the hybrid module of FIG. 1.

FIG. 1 illustrates a top-half cross-sectional view of hybrid module 100 according to an example embodiment of the disclosure. FIG. 2 illustrates a detail view of a portion of hybrid module 100 of FIG. 1. The following description is made with reference to FIGS. 1-2. Hybrid module 100 includes component 102, component 104, bearing 106 and retainer 108. Component 102 includes pilot surface 110 and threaded portion 112. Component 104 includes shaft 114 and tool 116. The tool includes drive profile 118. Bearing 106 is installed on pilot surface 110. Retainer 108 is threaded onto the threaded portion. The retainer includes drive profile 120, complementary to drive profile 118. By complementary, we mean that the two drive profiles can be drivenly engaged as will be described in more detail below.

Hybrid module 100 also includes bearing 122 and retaining ring 124. Bearing 122 is installed between component 102 and the shaft, and the retaining ring is installed in the shaft to prevent axial displacement of bearing 106 and shaft 114 relative to component 102. Retainer 108 is disposed on axial side 126 of bearing 106, and bearing 122 is disposed on axial side 128 of bearing 106, opposite axial side 126. In the embodiment shown in FIG. 1, component 102 is a portion of housing 130 for hybrid module 100. Housing 130 is arranged for fixing to a combustion engine (not shown) at lugs 132, for example, or a multi-speed transmission (not shown) at lugs 134, for example. Housing 130 may be made of aluminum and retainer 108 may also be made from aluminum to prevent corrosion between dissimilar metals to aid in disassembly. In some embodiments, retainer 108 is made from steel or hardened steel. An anti-seize lubricant may be used on the threaded portion to aid disassembly.

Component 104 includes backing plate 136 fixed to the shaft by staking, welding, or press fit, for example. Tool 116 is fixed to the backing plate by rivet 138, for example. Although the above components shown as fixed in a particular manner in the embodiment shown in FIG. 1, any manner of fixing components together known to one skilled in the art may be employed. Component 104 further includes clutch carrier 140 fixed to the backing plate by rivet 138, for example. Clutch carrier 140 forms a portion of KO clutch 142 for connecting and disconnecting electric motor 144 from the combustion engine (not shown) as is known in the art.

Hybrid module 100 includes rotor carrier 146. Bearing 106 includes inner race 148 installed on the pilot surface and outer race 150 installed in the rotor carrier to radially position the rotor carrier relative to component 102 (and housing 130). The retainer is tightened to apply a preload and prevent rotation of the inner race relative to the pilot surface. That is, although the bearing inner race to pilot surface may be a slip fit, the retainer is tightened to prevent wear from relative rotation between the inner race and pilot surface. Wear from a slip fit can be especially problematic when the first component (and pilot surface) are aluminum and the bearing inner race is hardened steel. Retainer 108 may also be used to apply a force necessary to press-fit the inner race 148 onto the pilot surface such that relative rotation is prevent by a combination of the press-fit and the retainer preload.

The outer race may be press-fit to the rotor carrier so that the outer race is frictionally held in the rotor carrier. By using a press-fit, wear between the outer race and rotor carrier can be eliminated or reduced, similar to the preload described above. Rotor carrier 146 is drivenly engaged with rotor 152 of electric motor 144. Hybrid module 100 also includes torque converter 154 fixed to the rotor carrier via rivet 156, for example. Shaft 114 includes spline 158 arranged for driving engagement with the combustion engine (not shown) or a damper (not shown). Hybrid module 100 includes clutch piston 164 sealed to the shaft by seal 166, for example, and bearing 168 installed radially between the pilot surface and the shaft.

Drive profile 118 includes circumferentially spaced indentations 160 and drive profile 120 includes circumferentially spaced tabs 162 arranged to engage the indentations. In the embodiment shown, tabs 162 extend radially inwards from tool 116. Other embodiments (not shown) may include tabs 162 extending axially towards indentations 160, for example. Although the mating profiles are described as indentations and mating tabs, other complementary geometries are possible. For example, the retainer and tool may include mating spline features that allow axial engagement for rotation of the retainer by the tool. Other possible engagement pairs may include holes or counterbores in the retainer and pins in the tool, or pins in the retainer and holes in the tool.

In an example embodiment (not shown), retainer 108 and/or tool 116 are designed to hold the retainer on the tool before threading onto threaded portion 112. Other embodiments may include using a weak adhesive to stick the retainer on the tool or magnetizing the tool or the retainer to keep them together, for example.

Figure 3:
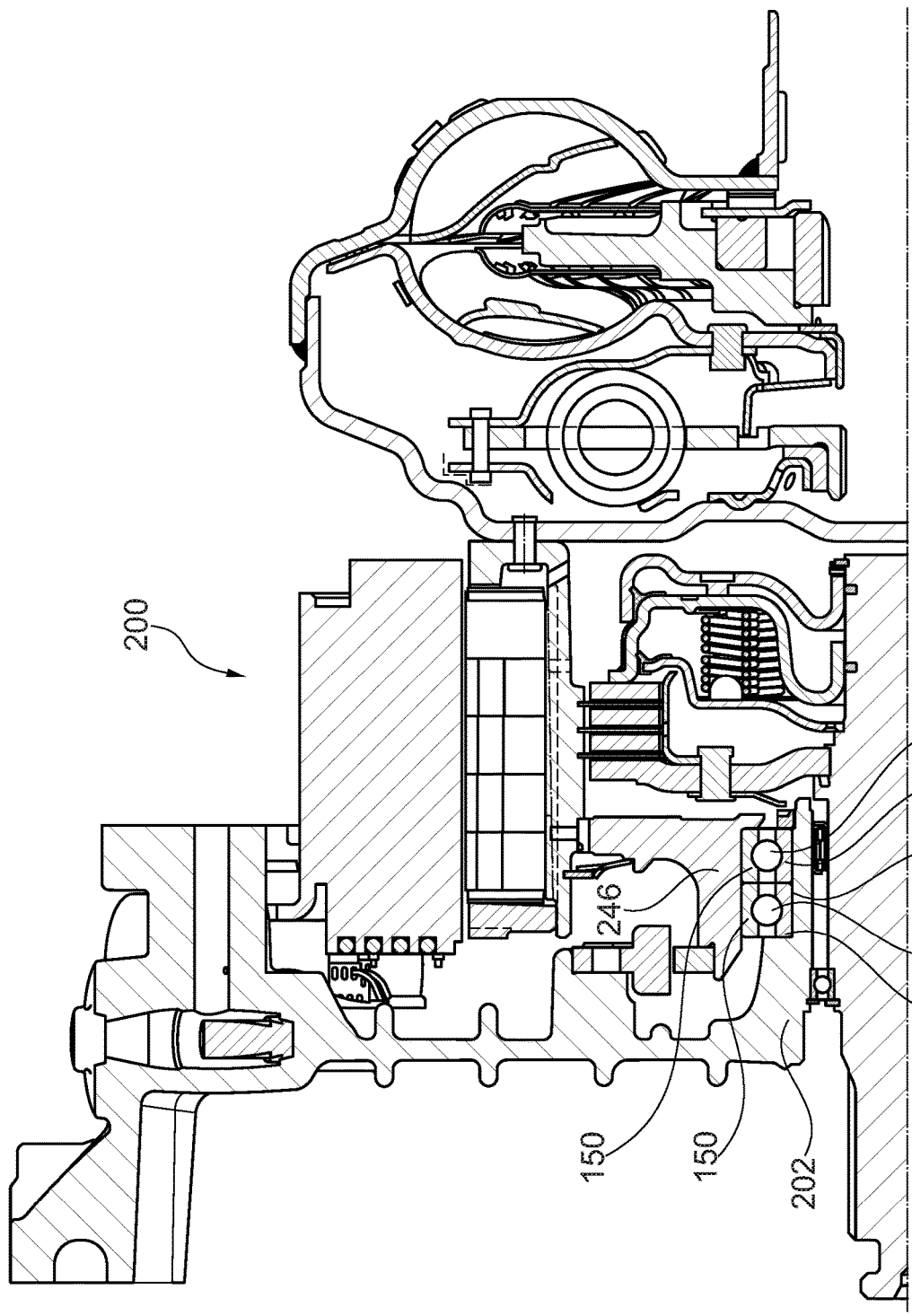
FIG. 3 illustrates a top-half cross-sectional view of a hybrid module according to an alternative embodiment of the disclosure.

FIG. 3 illustrates a top-half cross-sectional view of hybrid module 200 according to an alternative embodiment of the disclosure. The following description is made with reference to FIG. 3. Hybrid module 200 is generally the same as hybrid module 100 except as described below. Hybrid module 200 includes two bearings 106 with inner races 148 installed on pilot surface 210 of component 202. Outer races 150 are installed in rotor carrier 246.

Figure 4:
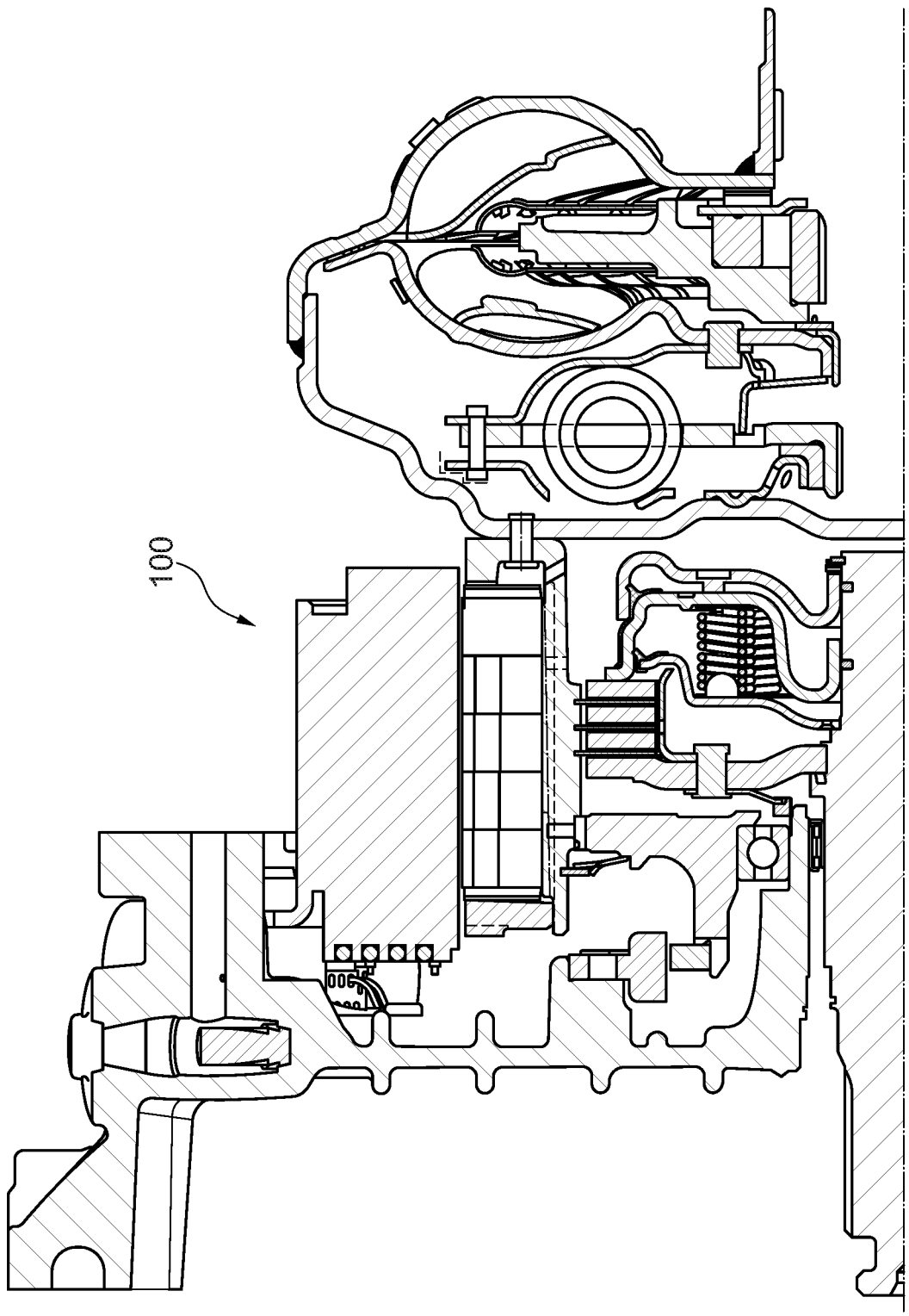
FIG. 4 illustrates a top-half cross-sectional view of the hybrid module of FIG. 1 during a first installation step.
Figure 5:
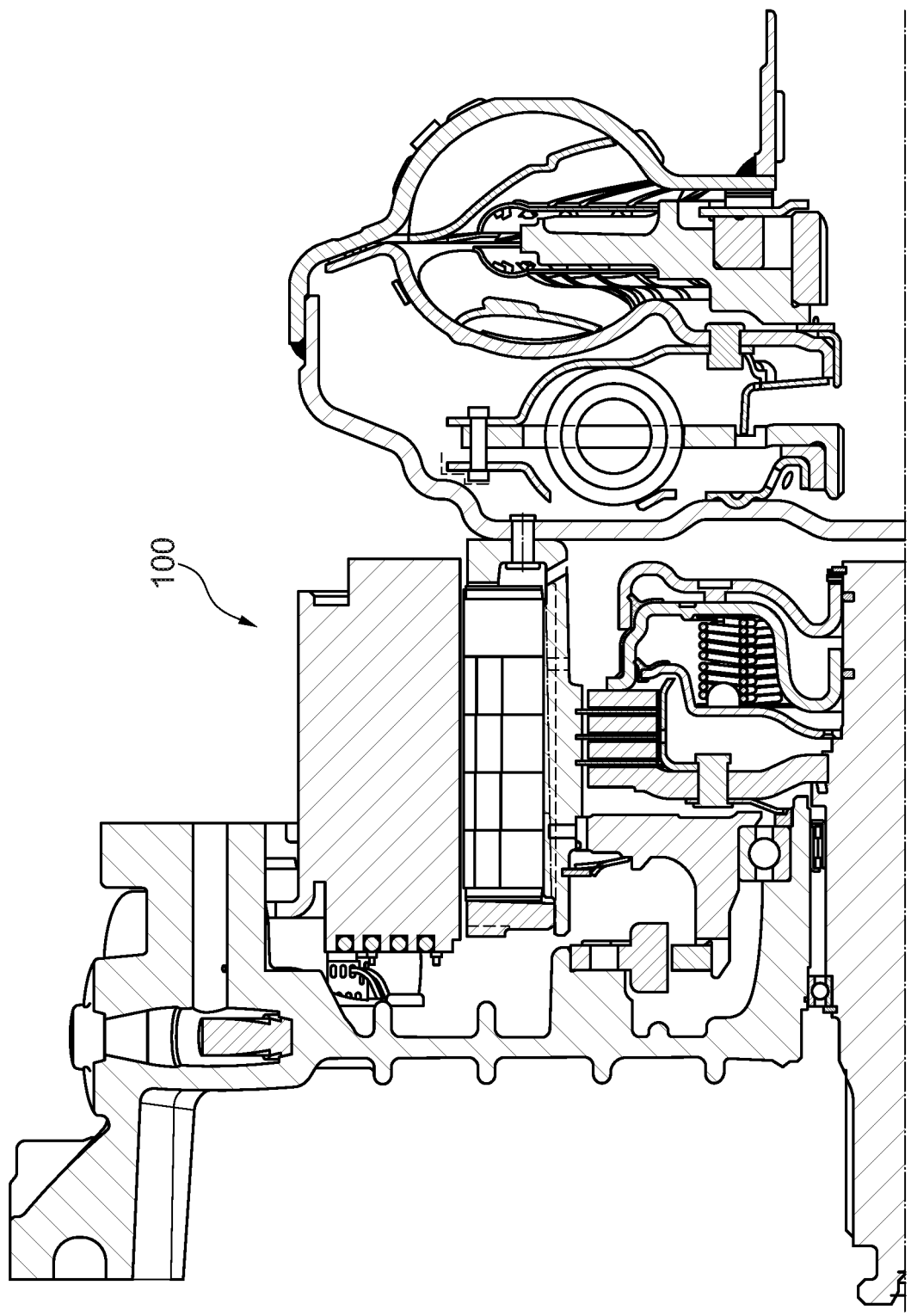
FIG. 5 illustrates a top-half cross-sectional view the hybrid module of FIG. 1 during a second installation step.

FIG. 4 illustrates a top-half cross-sectional view of hybrid module 100 during a first installation step. FIG. 5 illustrates a top-half cross-sectional view of hybrid module 100 during a second installation step. The following description is made with reference to FIGS. 1-5. The present disclosure also includes a method of installing a bearing in a hybrid module. The method includes providing a first component with a pilot surface and a threaded portion, providing a second component with a shaft and a tool, installing a first bearing on the pilot surface, engaging the tool with a retainer, rotating the shaft to thread the retainer onto the threaded portion using the tool, and axially displacing the shaft to disengage the tool from the retainer.

The disclosed method also includes installing a second bearing between the first component and the shaft, and installing a retaining ring to prevent axial displacement of the second bearing and the shaft relative to the first component. As described above, the first component is a portion of a housing for the hybrid module, and the housing is arranged for fixing to a combustion engine or a multi-speed transmission.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Hybrid module
102 Component (first)
104 Component (second)
106 Bearing (first)
108 Retainer
110 Pilot surface
112 Threaded portion
114 Shaft
116 Tool
118 Drive profile (first)
120 Drive profile (second)
122 Bearing (second)
124 Retaining ring
126 Axial side (first)
128 Axial side (second)
130 Housing
132 Lugs (engine)
134 Lugs (multi-speed transmission)
136 Backing plate
138 Rivet (backing plate/tool/clutch carrier)
140 Clutch carrier
142 KO clutch
144 Electric motor
146 Rotor carrier
148 Inner race (first bearing)
150 Outer race (first bearing)
152 Rotor
154 Torque converter
156 Rivet (torque converter/rotor carrier)
158 Spline (shaft)
160 Indentations (first drive profile)
162 Tabs (second drive profile)
164 Clutch piston
166 Seal (piston/shaft)
168 Bearing (third)
200 Hybrid module
202 Component (first)
246 Rotor carrier

What is claimed is:

1. A hybrid module comprising:
a first component comprising a pilot surface and a threaded portion;
a second component comprising a shaft and a tool, the tool comprising a first drive profile;
a first bearing installed on the pilot surface; and
a retainer threaded onto the threaded portion, the retainer comprising a second drive profile, complementary to the first drive profile.

2. The hybrid module of claim 1 further comprising:
a second bearing installed between the first component and the shaft; and
a retaining ring installed in the shaft or the first component to prevent axial displacement of the second bearing and the shaft relative to the first component.

3. The hybrid module of claim 2 wherein:
the retainer is disposed on a first axial side of the first bearing; and
the second bearing is disposed on a second axial side of the first bearing, opposite the first axial side.

4. The hybrid module of claim 1 wherein:
the first component is a portion of a housing for the hybrid module; and,
the housing is arranged for fixing to a combustion engine or a multi-speed transmission.

5. The hybrid module of claim 1 wherein:
the second component further comprises a backing plate fixed to the shaft; and
the tool is fixed to the backing plate.

6. The hybrid module of claim 5 wherein the second component further comprises a clutch carrier fixed to the backing plate.

7. The hybrid module of claim 1 further comprising a rotor carrier, wherein the first bearing comprises:
an inner race installed on the pilot surface; and
an outer race installed in the rotor carrier to radially position the rotor carrier relative to the first component.

8. The hybrid module of claim 7 wherein the rotor carrier is drivingly engaged with a rotor of an electric motor.

9. The hybrid module of claim 7 further comprising a torque converter fixed to the rotor carrier.

10. The hybrid module of claim 1 wherein the shaft comprises a spline arranged for driving engagement with a combustion engine or a damper.

11. The hybrid module of claim 1 wherein:
the first drive profile comprises a plurality of circumferentially spaced indentations; and
the second drive profile comprises a plurality of circumferentially spaced tabs arranged to engage the plurality of circumferentially spaced indentations.

12. The hybrid module of claim 11 wherein the plurality of circumferentially spaced tabs extend radially inwards.

13. The hybrid module of claim 1 further comprising a clutch piston sealed to the shaft.

14. The hybrid module of claim 1 further comprising a third bearing installed radially between the pilot surface and the shaft.

15. A method of installing a bearing in a hybrid module, comprising:
providing a first component with a pilot surface and a threaded portion;
providing a second component with a shaft and a tool;
installing a first bearing on the pilot surface;
engaging the tool with a retainer;
rotating the shaft to thread the retainer onto the threaded portion using the tool; and
axially displacing the shaft to disengage the tool from the retainer.

16. The method of claim 15 further comprising:
installing a second bearing between the first component and the shaft; and
installing a retaining ring to prevent axial displacement of the second bearing and the shaft relative to the first component.

17. The method of claim 15 wherein:
the first component is a portion of a housing for the hybrid module; and, the housing is arranged for fixing to a combustion engine or a multi-speed transmission.

* * * * *